No. 829,308. PATENTED AUG. 21, 1906.
C. T. WILLSON.
PROCESS OF ELECTROLYTICALLY TREATING MILK.
APPLICATION FILED JAN. 30, 1906.
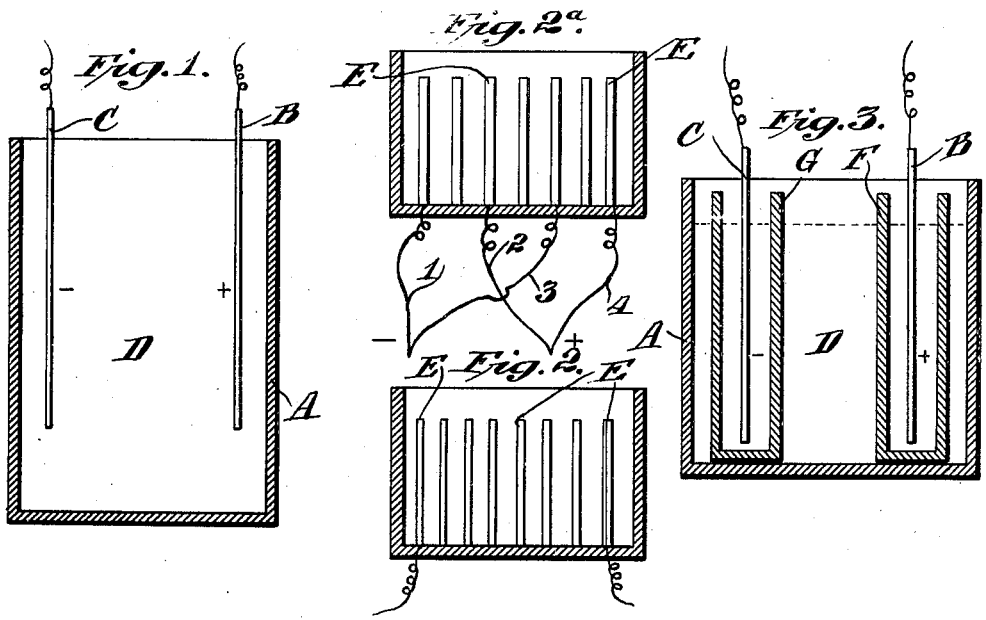
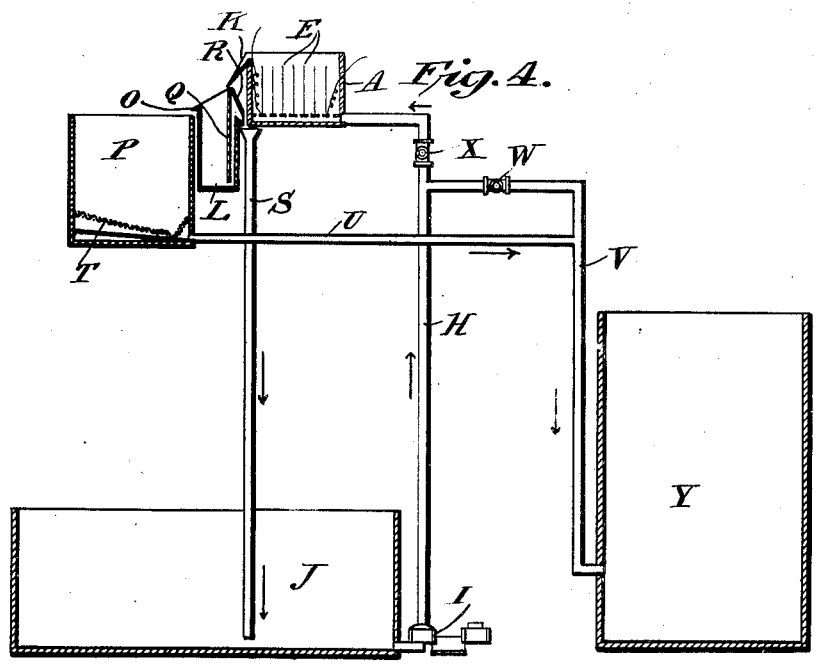
Attest:
E. Mitchell
A. L. O'Brien
Inventor:
Charles T. Willson
by Dickerson, Brown, Raegener & Binney
Attys

UNITED STATES PATENT OFFICE.

CHARLES T. WILLSON, OF AMENIA, NEW YORK, ASSIGNOR OF ONE-THIRD TO WILLIAM H. SHEFFIELD, OF HOBART, NEW YORK, AND ONE-THIRD TO LOUIS C. RAEGENER, OF NEW YORK, N. Y.

PROCESS OF ELECTROLYTICALLY TREATING MILK.

No. 829,308. Specification of Letters Patent. Patented Aug. 21, 1906.

Application filed January 30, 1906. Serial No. 298,601.

*To all whom it may concern:*

Be it known that I, CHARLES T. WILLSON, a citizen of the United States, and a resident of Amenia, Dutchess county, New York, have invented certain new and useful Improvements in Processes of Electrolytically Treating Milk, of which the following is a specification, accompanied by drawings.

This invention relates to a process of electrically treating skim-milk.

The object of the invention is to separate from milk a product for use in the arts and also as a food, consisting of albuminoids, casein, and albumen, with some sugar, which is held in solution together with moisture contained.

To these ends the invention consists of the process for carrying out the above objects and the resulting product, embodying the features hereinafter fully described and claimed in the specification.

The process is illustrated in the accompanying drawings, in which—

Figure 1 is a vertical sectional view of a simple form of electrolytic cell by means of which the process may be carried out, Fig. 2 is a sectional view of a modified form of cell. Fig. 2ª is a sectional view of a modification. Fig. 3 is a sectional view of another modified form of cell. Fig. 4 is an elevation, partly in section, of apparatus for carrying out the process.

Referring to the drawings, A represents an electrolytic cell having the anode B and cathode C and electrolyte D, which may be either skim or whole milk. If the product of this process is to be used as a food, the positive electrode B is preferably made of platinum, although when the product is used for other purposes in the arts this positive electrode may be made of carbon or any other suitable substance. The negative electrode C is made of some suitable non-corrosive conductor—as, for instance, nickel.

In carrying out the process a direct current of electricity of suitable voltage and current is first passed through the electrolyte, and under proper conditions the curd, in the form of a white substance resembling coagulated albumen, forms at the anode and floats to the surface of the electrolyte in small flakes, where it gathers. This curd consists of the albuminoids saturated with water and other constituents of the milk in solution. The curd is really heavier than the whey; but it rises to the surface due to the intermingled gas bubbles from the decomposition of the water. This action takes place until nearly all of the casein has been gathered. The whey then consists of water containing sugar of milk in solution and the remaining albumen. The curd is suitably removed from the electrolytic cell, together with some of the whey, while the remainder of the milk remains in the tank.

The temperature of the electrolyte may be prevented from rising by any suitable means—as, for instance, by circulating the electrolyte continuously through the cell or by jackets or other temperature-reducing means, and in the system shown in Fig. 4 I have illustrated means for circulating the electrolyte. While any difference of potential between electrodes will produce results, in practice it is desirable to so proportion the voltage to the area of the electrodes that there is no undue rise in temperature of the electrolyte, it being understood that suitable means are provided for at the same time restraining the rise in temperature of the electrolyte. The amperage used will of course depend upon the voltage and the resistance in the cell.

In Fig. 2 a modified form of cell is shown, in which there are a series of electrodes E, and current is passed into one of the end electrodes and out of the other end electrode, thereby constituting one side of each electrode positive and the other side negative. In Fig. 2ª the electrodes E are broken up into groups by means of the connections 1, 2, 3, and 4, and the wires 2 and 4 run to the positive side of the source of supply, while the wires 1 and 3 lead to the negative side. This construction may be resorted to, if desired.

In Fig. 3 a construction is shown in which a liquid may be utilized as an electrode, and within the tank A are porous cups F and G, containing the liquids which form the electrodes. Both cups F and G may contain acidulated water, for instance, or any other suitable liquid. Dipping into each cup is an electrode, in this instance B being the anode and C the cathode, while D is the electrolyte, as before.

In Fig. 4 A represents the electrolytic tank, and E the electrodes therein, adapted to be suitably connected to the source of a direct current. The milk is pumped up through pipe H by pump I from the tank J into the tank A, and by this means a continuous circulation is maintained in the tank A. The overflow from the tank A is represented at K in the form of a spout, through which the curd and milk which has been slightly treated pass to the settling-tank L. In the tank L the curd is trapped and compelled to accumulate on the surface and is crowded over the lip O into the curd-tank P. The slightly-treated milk passes up outside of the partition Q in tank L, through the spout R, and into the liquid-return pipe S, thereby returning to the tank J, and from thence the liquid is again pumped up through the pipe H and into the tank A, thus maintaining the circulation until all the casein has been recovered. The continuous circulation of the liquid prevents the temperature of the electrolyte from rising too high.

In the bottom of the curd-tank P is shown a strainer T, through which the liquid is strained and the curd maintained in the tank P. The liquid passes through the pipe U to the pipe V, which in turn is connected to the pipe H. Pipe V is provided with a valve W, and pipe H is provided with a valve X. Pipe V connects with the whey-tank Y. The whey is continuously draining from the curd in the tank P, passing through the pipe U and down through the pipe V into the tank Y. As long as the valve X is open the circulation is continuing through the tank A. After the process is complete the valve X is closed and the valve W is opened, so that the pump I pumps the liquid from the tank J through pipes H and V into the tank Y.

The product obtained in the tank P is the milk curd, consisting of the albuminoids, casein, and albumen, with some sugar, which is held in solution and the moisture contained. In the tank Y a non-acid whey is obtained, containing the milk, sugar, and some albumen. In processes heretofore carried out it was not possible to recover the curd without leaving an acid whey; but in accordance with this process the curd is separated and recovered and a practically non-acid whey is obtained. The curd itself may be termed a "sweet" curd, as it is practically non-acid. This curd is comparable in appearance to the coagulated white of an egg.

I claim, and desire to obtain by Letters Patent, the following:

1. A process substantially as herein described of electrically treating skim-milk, which consists in passing a direct current of electricity through the milk, thereby separating the albuminoids, casein and albumen therefrom and removing said albuminoids.

2. The process substantially as herein described of electrically treating skim-milk, which consists in passing a direct current of electricity therethrough, thereby separating the curd containing the albuminoids, casein and albumen from the whey and removing the curd from the whey.

3. The process substantially as herein described of electrically obtaining the albuminoids, casein and albumen from skim-milk, which consists in passing a direct current of electricity through the milk, thereby causing the curd consisting of the albuminoids, casein and albumen to rise to the surface of the electrolyte, and then suitably removing said curd from the electrolyte.

4. The process substantially as herein described of continuously electrically treating skim-milk, which consists in continuously passing the milk through a suitable electrolytic tank and passing a direct current of electricity through the milk in said tank, thereby separating from the milk the curd containing the albuminoids, casein and albumen, and continuously removing said curd from the milk.

5. The process of treating skim-milk, which consists of passing a direct current of electricity through the milk, and thereby separating the curd from the whey.

In testimony whereof I have signed this specification in the presence of two subscribing witnesses.

CHARLES T. WILLSON.

Witnesses:
CHAS. B. CAPRON,
ROBT. S. DAVIS.